(12) United States Patent
Ikuta

(10) Patent No.: US 9,992,985 B2
(45) Date of Patent: Jun. 12, 2018

(54) DUAL-BEARING REEL

(71) Applicant: Shimano Inc., Sakai, Osaka (JP)

(72) Inventor: Takeshi Ikuta, Osaka (JP)

(73) Assignee: Shimano Inc., Osaka (JP)

( * ) Notice: Subject to any disclaimer, the term of this patent is extended or adjusted under 35 U.S.C. 154(b) by 0 days. days.

(21) Appl. No.: 15/058,098

(22) Filed: Mar. 1, 2016

(65) Prior Publication Data

US 2016/0278355 A1    Sep. 29, 2016

(30) Foreign Application Priority Data

Mar. 27, 2015 (JP) ................................. 2015-066445
Sep. 30, 2015 (JP) ................................. 2015-172608

(51) Int. Cl.
*A01K 89/01* (2006.01)
*A01K 89/033* (2006.01)

(52) U.S. Cl.
CPC ................................. *A01K 89/046* (2015.05)

(58) Field of Classification Search
CPC .... A01K 89/033; A01K 89/05; A01K 89/057; A01K 89/059
See application file for complete search history.

(56) References Cited

U.S. PATENT DOCUMENTS

| | | | | |
|---|---|---|---|---|
| 3,146,966 A * | 9/1964 | Dunn | ................... | A01K 89/033 242/271 |
| 4,742,974 A * | 5/1988 | Furomoto | ............ | A01K 89/033 242/271 |
| 4,871,129 A * | 10/1989 | Hashimoto | .......... | A01K 89/033 242/255 |
| 5,348,247 A * | 9/1994 | Kaneko | ................ | A01K 89/033 242/303 |
| 5,497,953 A * | 3/1996 | Betto | ................... | A01K 89/033 242/270 |
| 6,578,785 B1 * | 6/2003 | Hong | ................... | A01K 89/033 242/245 |
| 7,234,661 B2 * | 6/2007 | Hirayama | ............ | A01K 89/006 242/303 |
| 7,429,011 B1 * | 9/2008 | Chang | .................. | A01K 89/033 242/245 |
| 7,552,886 B2 * | 6/2009 | Kim | ...................... | A01K 89/033 242/246 |
| 7,784,725 B2 * | 8/2010 | Chun Wee | ........... | A01K 89/015 242/247 |
| 7,823,823 B2 * | 11/2010 | Hirayama | ............ | A01K 89/033 242/245 |

(Continued)

FOREIGN PATENT DOCUMENTS

JP            3193871 U            10/2014

*Primary Examiner* — Emmanuel M Marcelo
(74) *Attorney, Agent, or Firm* — Global IP Counselors, LLP

(57) ABSTRACT

A dual-bearing reel includes a reel body, a spool, a drag mechanism, a drag lever, and an engagement member. The drag mechanism is configured to brake the rotation of the spool. The drag lever is pivotably attached to the first reel body portion so as to be operable between a first region and a second region. The engagement member protrudes from the drag lever when the drag lever is in the first region. Further, the engagement member is retracted into the drag lever when the drag lever is in the second region.

14 Claims, 10 Drawing Sheets

(56) References Cited

U.S. PATENT DOCUMENTS

| | | | | |
|---|---|---|---|---|
| 7,845,590 B2 * | 12/2010 | Ikuta | ................... | A01K 89/033 |
| | | | | 242/296 |
| 7,850,110 B2 * | 12/2010 | Hirayama | ............ | A01K 89/033 |
| | | | | 242/266 |
| 8,066,216 B2 * | 11/2011 | Takechi | ............... | A01K 89/033 |
| | | | | 242/246 |
| 8,899,506 B2 * | 12/2014 | Takechi | ............... | A01K 89/033 |
| | | | | 242/286 |

* cited by examiner

DUAL-BEARING REEL

CROSS-REFERENCE TO RELATED APPLICATIONS

This application claims priority based on Japanese Patent Application Nos. 2015-066445, filed in the Japan Patent Office on Mar. 27, 2015, and 2015-172608, filed in the Japan Patent Office on Sep. 30, 2015, the contents of each of which is hereby incorporated herein by reference.

BACKGROUND

Field of the Invention

The present invention relates to a dual-bearing reel.

Background Information

The dual-bearing reel disclosed in Japanese Utility Model Registration No. 3193871 comprises a drag mechanism for braking the rotation of a spool, and a drag lever for adjusting the braking force by the drag mechanism. The drag lever is pivotably mounted on the side surface of the reel body. The braking force by the drag mechanism can be adjusted by pivoting this drag lever.

For example, when unreeling (casting) a fishing line from the spool, the drag lever is operated to a first region to release the braking of the drag mechanism. Thus, the spool is freely rotated and the fishing line can be cast. On the other hand, when winding the fishing line, the drag lever is operated from the first region to a second region. The drag mechanism thereby applies a predetermined braking force to the spool; that is, the rotation of the spool is braked by a predetermined braking force.

To automatically carry out this pivoting of the drag lever from the first region to the second region, a lever abutting portion that protrudes from the handle to the drag lever side is provided. When the handle is rotated, the lever abutting portion abuts the drag lever. Accordingly, the drag lever is able to pivot from the first region to the second region along with the rotation of the handle. Meanwhile, when the drag lever is in the second region, the lever abutting portion does not abut the drag lever.

SUMMARY

Since a lever abutting portion protrudes from the handle in the dual-bearing reel described above, problems such as the fishing line being tangled onto this lever abutting portion can occur.

The object of the present invention is to provide a dual-bearing reel that is capable of pivoting the drag lever along with the rotation of the handle without the fishing line becoming tangled.

The dual-bearing reel according to one aspect of the present invention comprises a reel body, a spool, a drag mechanism, a drag lever, and an engagement member. The reel body comprises a first reel body portion and a second reel body portion. The spool is disposed between the first reel body portion and the second reel body portion. The drag mechanism is configured to brake the rotation of the spool. The drag lever is attached to the first reel body portion so as to be pivotable between a first region and a second region. The drag lever is a member for adjusting the braking force of the drag mechanism. The engagement member protrudes from the drag lever when the drag lever is in the first region. Further, the engagement member is retracted into the drag lever when the drag lever is in the second region.

According to this configuration, the engagement member protrudes from the drag lever when the drag lever is in the first region. Accordingly, for example, when the engagement member protrudes so as to engage the handle and the handle is rotated, the handle engages the engagement member, causing the drag lever to be operated. Then, when the drag lever is operated to the second region, the engagement member is retracted into the drag lever. Accordingly, the engagement between the handle and the engagement member is released, and the pivoting of the drag lever is stopped. In this manner, by protruding the engagement member so as to engage the handle in the present invention, the drag lever can pivot along with the rotation of the handle. Then, when the drag lever is rotated to the second region, the engagement member is retracted into the drag lever; therefore, the problem of the fishing line becoming tangled can be eliminated.

Preferably, braking of the rotation of the spool is released when the drag lever is in the first region, and the rotation of the spool is braked when the drag lever is in the second region. According to this configuration, when the spool is freely rotated, the engagement member is protruding; as a result, the drag lever can pivot by the rotation of the handle. Further, when the rotation of the spool is braked, the engagement member is retracted; as a result, the drag lever will not be operated by the rotation of the handle.

Preferably, in a third region between the first region and the second region, the braking force is increased as the drag lever approaches the second region. According to this configuration, the braking force in the third region between the first region and the second region can be more finely set.

Meanwhile, in the dual-bearing reel of Japanese Utility Model Publication No. 3193871 described above, when the drag lever is in the third region between the first region and the second region, the lever abutting portion interferes with the drag lever. Consequently, the drag lever cannot be held in the third region. That is, there is the problem that the handle cannot be rotated while maintaining a state in which a braking force that is smaller than the braking force that is set in the second region is applied to the spool.

In contrast, in the dual-bearing reel according to the present invention, the engagement member preferably protrudes from the drag lever when the drag lever is operated from the first region to the third region. Further, the engagement member is retracted into the drag lever when the drag lever is operated from the second region to the third region.

According to this configuration, since the engagement member protrudes when the drag lever is operated from the first region to the third region, the drag lever can be operated from the first region to the second region by rotating the handle. Further, the engagement member is retracted when the drag, lever is operated from the second region to the third region. Accordingly, the handle and the engagement member do not engage, even when the drag lever is in the third region. As a result, the handle can be rotated while maintaining the drag lever in the third region. That is, the handle can be rotated in a state in which a braking force that is smaller than the braking force that is set in the second region is applied to the spool.

Preferably, the dual-bearing reel further comprises a rail that is disposed on the first reel body portion. The engagement member comprises a first end and a second end. The first end protrudes from the drag lever or retracts into the drag lever. The second end is guided by the rail. The rail comprises a first cam part and a second cam part. The first cam part is configured to cause the first end to protrude from the drag lever. The second cam part is configured to cause the first end to retract into the drag lever.

Preferably, the rail comprises a first pathway and a second pathway. When the drag lever is operated from the first region to the third region, the second end of the engagement member passes through the first pathway. Further, when the drag lever is operated from the second region to the third region, the second end of the engagement member passes through the second pathway.

The rail preferably comprises a third pathway that communicates with the first and second pathways and a one-way mechanism. The one-way mechanism is configured to block the third pathway from the second pathway when the second end moves from the third pathway to the first pathway. Further, the one-way mechanism is configured to enable the third pathway to communicate with the second pathway when the second end moves from the second pathway to the third pathway.

Preferably, the one-way mechanism is a plate spring.

Preferably, when a force of a predetermined value or greater acts on the engagement member in a direction in which the first end is retracted, the first cam part is configured to move in the direction in which the first end is retracted.

Preferably, the dual-bearing reel further comprises a biasing member for biasing the engagement member in a direction in which the engagement member is retracted.

Preferably, the dual-bearing reel further comprises a resin cover member. The cover member is disposed between the engagement member and the drag lever. According to this configuration, the cover member prevents the engagement member from coming in contact with the drag lever. As a result, when the engagement member is made of metal, the engagement member can be prevented from undergoing galvanic corrosion.

Preferably, the dual-bearing reel further comprises a sound generating mechanism that generates a sound along with the pivoting of the drag lever.

The sound generating mechanism can comprise a striking pin, a striking part, and a biasing part. The striking pin protrudes from the drag lever. The striking part is disposed on the reel body and is struck by the striking pin. The biasing part biases the striking pin to strike the striking part.

According to the dual-bearing reel of the present invention, the drag lever can be caused to pivot along with the rotation of the handle, without the fishing line becoming tangled.

BRIEF DESCRIPTION OF THE DRAWINGS

Referring now to the attached drawings which form a part of this original disclosure.

DETAILED DESCRIPTION OF THE EMBODIMENTS

Figure 1:
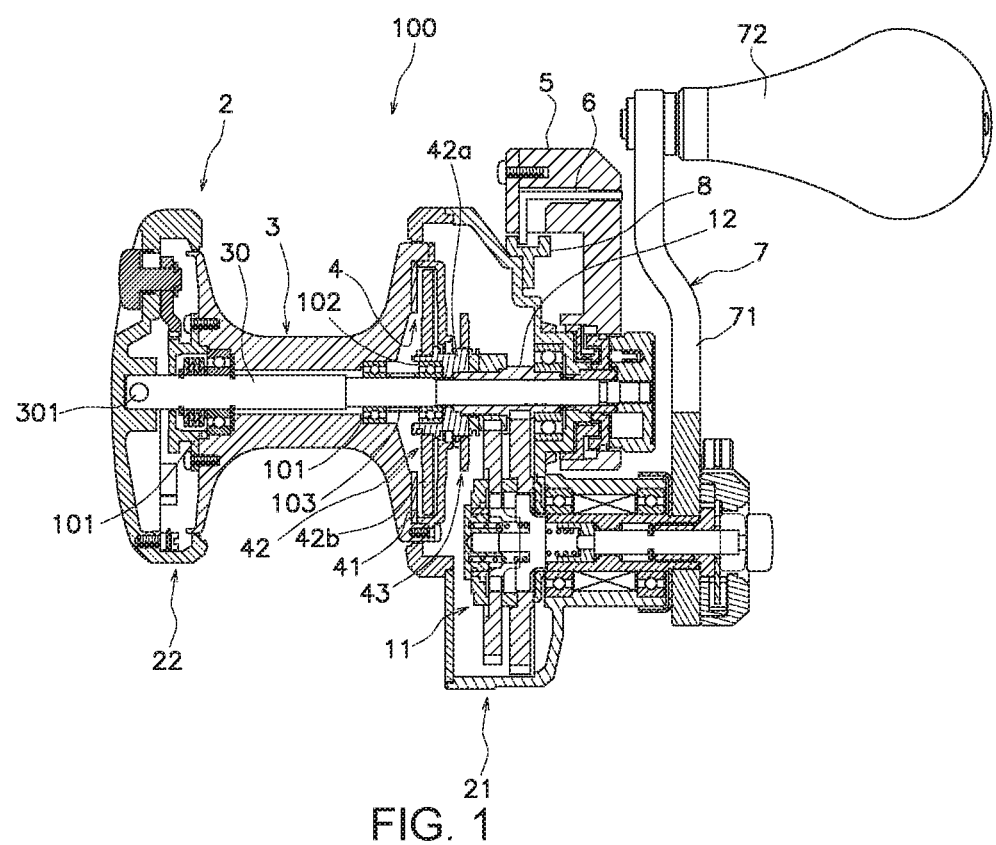
FIG. 1 is a cross-sectional view of the dual bearing reel.

Embodiments of the dual-bearing reel according to the present invention will be described below, with reference to the drawings. FIG. 1 is a cross-sectional view of the dual-bearing reel. The axial direction means the direction in which the rotational axis of the spool extends. Specifically, the left and right direction in FIG. 1 is the axial direction. The circumferential direction means the circumferential direction of the circle having the rotational axis of the spool as the center. The radial direction means the radial direction of the circle having the rotational axis of the spool as the center.

As shown in FIG. 1, the dual-bearing reel 100 comprises a reel body 2, a spool 3, a drag mechanism 4, a drag lever 5, and an engagement member 6. The dual-bearing reel 100 also comprises a handle 7, a rail 8, and the like.

The reel body 2 comprises a first reel body portion 21 and a second reel body portion 22. The first reel body portion 21 and the second reel body portion 22 are disposed at an interval from each other in the axial direction. The first reel body portion 21 and the second reel body portion 22 are coupled to each other via a connecting portion (not shown) that extends in the axial direction.

The spool 3 is disposed between the first reel body portion 21 and the second reel body portion 22. In particular, the spool 3 extends in the axial direction having a substantially cylindrical shape. The spool 3 is relatively rotatable with respect to the spool shaft 30. Specifically, the spool 3 is attached to the spool shaft 30 via two axle bearing members 101. Further, the spool 3 is integrally moved in the axial direction of the spool shaft 30.

The spool shaft 30 is supported by the first reel body portion 21 and the second reel body portion 22. Meanwhile, the spool shaft 30 is non-rotatable. For example, the spool shaft 30 is configured so as to not rotate by a rotation prevention pin 301 which extends through the spool shaft 30 being engaged with the reel body 2.

As shown in FIG. 1, the handle 7 is a member for rotating the spool 3, and is rotatably mounted to the first reel body portion 21. In particular, the handle 7 comprises a handle arm 71 and a grip portion 72. The handle arm 71 extends substantially perpendicularly to the axial direction. That is, the handle arm 71 extends in the radial direction. The grip portion 72 is rotatably mounted to the distal end portion of the handle arm 71. When the handle arm 71 is rotated, the spool 3 is rotated via a rotation transmission mechanism 11.

The drag mechanism 4 is configured to brake the rotation of the spool 3. In particular, the drag mechanism 4 is configured to brake the free rotation of the spool 3. By the drag mechanism 4 being actuated, the rotation of the spool 3 is transmitted to the handle 7, and the rotation of the handle 7 is transmitted to the spool 3. The drag mechanism 4 comprises a friction disk 41 and a drag disk 42.

The friction disk 41 is attached to the end surface of the spool 3. In particular, the friction disk 41 is attached to the end surface of the spool 3 on the first reel body portion 21 side. The friction disk 41 has an annular shape. The friction disk 41 is formed from a wear-resistant material such as carbon graphite or fiber-reinforced resin.

The drag disk 42 comprises a disk main body 42a and a brake disk 42b. The disk main body 42a engages with the pinion gear 12. Accordingly, the disk main body 42a is integrally rotated with the pinion gear 12. The disk main body 42a is rotatably supported by the spool shaft 30 by an axle bearing member 102.

The brake disk 42b is fixed to the disk main body 42a. The brake disk 42b is disposed to oppose the friction disk 41. In particular, the outer perimeter part of the brake disk 42b is opposed to the friction disk 41. The rotation of the spool 3 is braked by the brake disk 42b being frictionally engaged with the friction disk 41.

Figure 2:
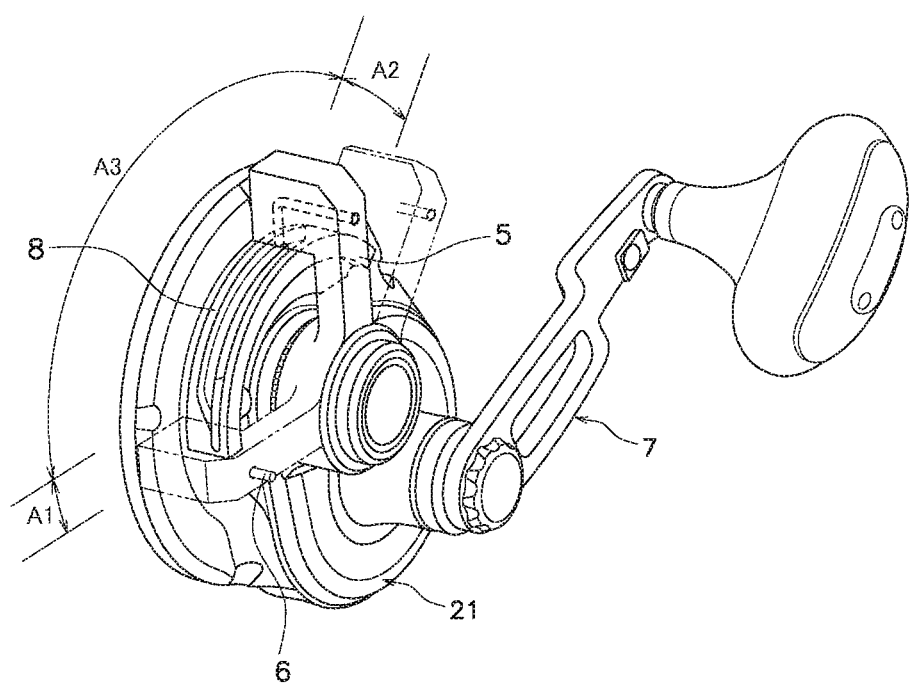
FIG. 2 is a perspective view of the dual-bearing reel on the first reel body portion side.

The drag lever 5 is attached to the first reel body port on 21. The drag lever 5 is a member for adjusting the braking force of the drag mechanism 4. The drag lever 5 is pivotable around the spool shaft 30. As shown in FIG. 2, the region in which the drag lever 5 is operated includes a first region A1, a second region A2, and a third region A3. The third region A3 is a region between the first region A1 and the second region A2 in the circumferential direction. That is, the drag lever 5 is configured to be operated between the first region A1 and the second region A2. Meanwhile, the drag lever 5 is also operated within the first and the second regions A2.

The braking of the rotation of the spool 3 is released, when the drag lever 5 is in the first region A1. In particular, when the drag lever 5 is in the first region A1, the spool 3 and the spool shaft 30 are moved to the second reel body portion 22 side in the axial direction by a coil spring 103. As a result, the frictional engagement between the friction disk 41 and the brake disk 42b is released.

On the other hand, the rotation of the spool 3 is braked when the drag lever 5 is in the second region A2 and the third region A3. Further, the braking force by the drag mechanism 4 is increased as the drag lever 5 is operated in a direction away from the first region A1. In particular, when the drag lever 5 is in the second region A2 and the third region A3, the spool 3 and the spool shaft 30 are moved to the first reel body portion 21 side in the axial direction. As a result, the force with which the friction disk 41 presses the brake disk 42b is stronger as the drag lever 5 approaches the second region A2. Meanwhile, it is not necessary for the braking force of the drag mechanism 4 to act on a portion of the third region A3 that is near the first region A1.

The engagement member 6 protrudes from the drag lever 5 when the drag lever 5 is in the first region A1. Further, the engagement member 6 is retracted into the drag lever 5 when the drag lever 5 is in the second region A2. The engagement member 6 protrudes from the drag lever 5 when the drag lever 5 is operated from the first region A1 to the third region A3. In particular, the engagement member 6 is protruded from the drag lever 5 when the drag lever 5 passes through the third region A3 in the steps of moving from the first region A1 to the second region A2. Further, the engagement member 6 is retracted into the drag lever 5 when the drag lever 5 is operated from the second region A2 to the third region A3. In particular, the engagement member 6 is retracted into the drag lever 5 when the drag lever 5 passes through the third region A3 in the steps of moving from the second region A2 to the first region A1.

Figure 3:
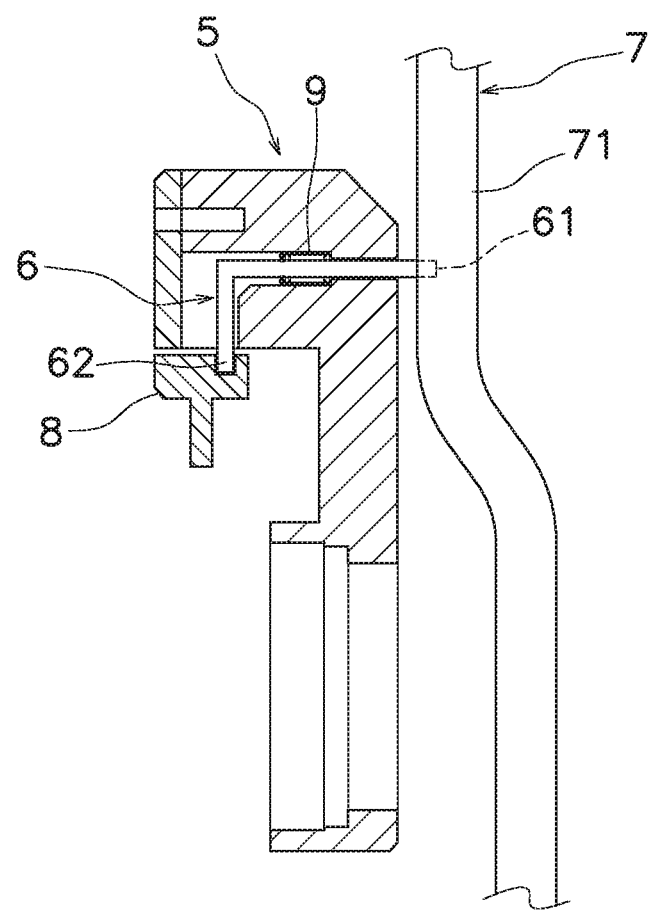
FIG. 3 is a cross-sectional view of the drag lever when positioned in the first region.
Figure 4:
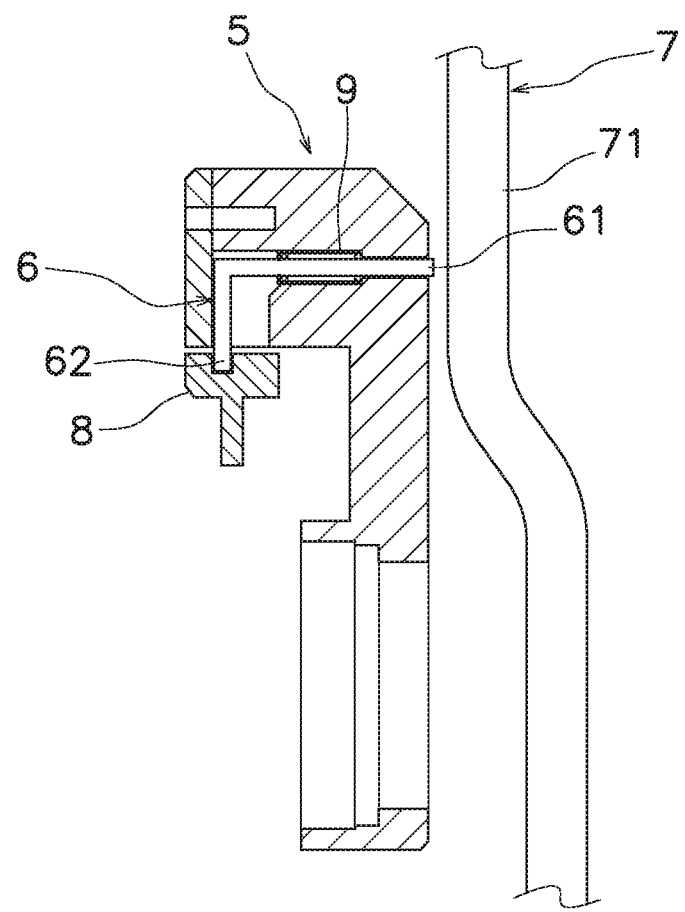
FIG. 4 is a cross-sectional view of the drag lever when positioned in the second region.

The engagement member 6 comprises a first end 61 and a second end 62, as shown in FIG. 3 and FIG. 4. The engagement member 6 is L-shaped, and comprises a portion that extends in the axial direction and a portion that extends in the radial direction. The end of the portion that extends in the axial direction is the first end 61, and the end of the portion that extends in the radial direction is the second end 62.

The first end 61 protrudes from the drag lever 5 or retracts into the drag lever 5, along with the pivoting of the drag lever 5. Specifically, when the drag lever 5 is in the first region A1, the first end 61 protrudes from the drag lever 5 so as to be engaged with the handle 7, as shown in FIG. 3. That is, the first end 61 protrudes into the handle 7 side in the axial direction. Accordingly, when the handle 7 is rotated, the handle arm 71 abuts against the first end 61.

When the drag lever 5 is in the second region A2, the first end 61 of the engagement member 6 retracts into the drag lever 5 so as not to be engaged with the handle 7, as shown in FIG. 4. Accordingly, the handle arm 71 does not abut against the first end 61 of the engagement member 6, even when the handle 7 is rotated. Meanwhile, it is not necessary for the first end 61 to be fully housed in the drag lever 5, and may slightly protrude from the drag lever 5, as long as the end does not engage with the handle 7.

The second end 62 is guided by the rail 8. In particular, the second end 62 protrudes from the drag lever 5 radially inwardly, and is guided by the pathway 80 of the rail 8. When the drag lever 5 is operated, this second end 62 is guided by the pathway of the rail 8 and moved in the axial direction. As a result, the first end 61 protrudes from the drag lever 5 or retracts into the drag lever 5.

The engagement member 6 can be biased in the retracting direction by a biasing member 9. This biasing member 9 is, for example, a coil spring. The biasing member 9 biases the engagement member 6 in a direction in Which the engagement member 6 is separated from the handle 7 in the axial direction.

As shown in FIG. 2, the rail 8 is disposed on the first reel body portion 21. The rail 8 may be a separate member from the first reel body portion 21, or may be formed by a single member with the first reel body portion 21.

Figure 5:
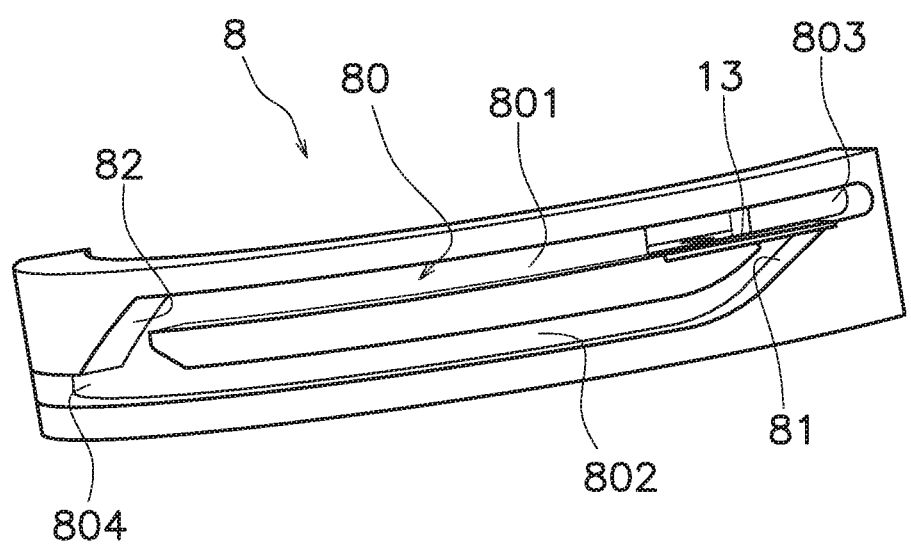
FIG. 5 is a perspective view of the rail.

FIG. 5 is a perspective view of the rail 8. In FIG. 5, the handle 7 is disposed as described above. As shown in FIG. 5, the rail 8 is configured to guide the second end 62 of the engagement member 6. In particular, the rail 8 comprises a groove-like pathway 80. Since the second end 62 is disposed in this pathway 80, the second end 62 is guided along the pathway 80. The pathway 80 is opened toward the radially outer side.

In particular, the rail 8 comprises a first pathway 801, a second pathway 802, a third pathway 803, and a fourth pathway 804. Further, the rail 8 comprises a first cam part 81 and a second cam part 82.

The first pathway 801 and the second pathway 802 extend parallel to each other. The first pathway 801 and the second pathway 802 extend in the circumferential direction. The first pathway 801 is disposed further on the handle 7 side than the second pathway 802 in the axial direction. Accordingly, when the second end 62 passes through the first pathway 801, the first end 61 protrudes from the drag lever 5. Further, when the second end 62 passes through the second pathway 802, the first end 61 protrudes from the drag lever 5.

The third pathway 803 communicates with the first and the second pathways 801, 802. The third pathway 803 is disposed on an extension line of the first pathway 801 in the circumferential direction. That is, the third pathway 803 is disposed in the same position as the first pathway 801 and further on the handle 7 side than the second pathway 802, in the axial direction. That is, when the second end 62 of the engagement member 6 is on the third pathway 803, the first end 61 of the engagement member 6 protrudes from the drag lever 5. The third pathway 803 and the second pathway 802 are coupled via the first cam part 81.

The first cam part 81 is configured to cause the first end 61 to protrude from the drag lever 5. Specifically, the first cam part 81 is formed by an inclined surface that faces the handle 7 side in the axial direction. This inclined surface is inclined so as to approach the handle 7 side when approaching the third pathway 803. Accordingly, the second end 62, which is guided along this inclined surface, is moved to the handle 7 side when approaching the third pathway 803. As a result, the first end 61 protrudes from the drag lever 5.

The fourth pathway 804 communicates with the first and the second pathways 801, 802. The first and the second pathways 801, 802 are disposed between the third pathway 803 and the fourth pathway 804 in the circumferential direction. The fourth pathway 804 is disposed on an extension line of the second pathway 802 in the circumferential direction. That is, the fourth pathway 804 is disposed in the same position as the second pathway 802 and in a position that is further separated from the handle 7 than the first pathway 801, in the axial direction. That is, when the second end 62 of the engagement member 6 is on the fourth pathway 804, the first end 61 of the engagement member 6 retracts into the drag lever 5. The fourth pathway 804 and the first pathway 801 are coupled via the second cam part 82.

The second cam part 82 is configured to cause the first end 61 to retract into the drag lever 5. Specifically, the second cam part 82 is formed of an inclined surface that faces the opposite side of the handle 7 in the axial direction. This inclined surface is inclined so as to move away from the handle 7 side when approaching the fourth pathway 804. Accordingly, the second end 62, which is guided along this inclined surface, is moved in a direction away from the handle 7 when approaching the fourth pathway 804. As a result, the first end 61 is retracted into the drag lever 5.

The second end 62 of the engagement member 6 passes through the first pathway 801 when the drag lever 5 passes through the third region A3 in the steps of moving from the first region A1 to the second region A2. That is, when the drag lever 5 is operated from the first region A1, to the third region A3, and then to the second region A2, in that order, the second end 62 moves in the pathway 80 in order from the third pathway 803, the first pathway 801, and the fourth pathway 804.

The second end 62 of the engagement member 6 passes through the second pathway 802 when the drag lever 5 passes through the third region A3 in the steps of moving from the second region A2 to the first region A1. That is, when the drag lever 5 is operated from the second region A2, to the third region A3, and then to the first region A1, in that order, the second end 62 moves in the pathway 80 in order from the fourth pathway 804, the second pathway 802, and the third pathway 803.

A one-way mechanism 13 is disposed between the third pathway 803 and the first pathway 801. The one-way mechanism 13 is, for example, a plate spring. The one-way mechanism 13 is configured to block the third pathway 803 from the second pathway 802 when the second end 62 moves from the third pathway 803 to the first pathway 801. That is, the one-way mechanism 13 guides the second end 62 from the third pathway 803 to the first pathway 801.

The one-way mechanism 13 enables the third pathway 803 to communicate with the second pathway 802 when the second end 62 moves from the second pathway 802 to the third pathway 803. That is, the one-way mechanism 13 guides the second end 62 from the second pathway 802 to the third pathway 803. Specifically, the plate spring, which is the one-way mechanism 13, is elastically deformed to the handle 7 side by being pressed by the second end 62, and communicates the second pathway 802 with the third pathway 803.

When the second end 62 is in the third pathway 803, the drag lever 5 is positioned in the first region A1. When the second end 62 is in the fourth pathway 804, the drag lever 5 is positioned in the second region A2. Further, when the second end 62 is in the first or the second pathways 801, 802, the drag lever 5 is positioned in the third region A3.

The operation of the dual-bearing reel 100 configured as described above will be described. First, when casting the fishing line in a forward direction, the drag lever 5 is operated to the first region A1. The braking of the spool 3 by the drag mechanism 4 is thereby released; the spool 3 is freely rotatable, and is rotated in the casting direction by the weight of the tackle. Further, when the drag lever 5 is operated to the first region A1, the second end 62 of the engagement member 6 is moved to the third pathway 803 via the first cam part 81, and the engagement member 6 is moved to the handle 7 side. As a result, the first end 61 of the engagement member 6 protrudes the drag lever 5.

Next, the handle 7 is rotated clockwise in FIG. 2 to wind the fishing line. When the handle 7 reaches the drag lever 5, the handle arm 71 engages the first end 61 of the engagement member 6. Then, when the handle 7 is rotated from that state, since the first end 61 of the engagement member 6 is engaged with the handle 7, the drag lever 5 is operated from the first region A1 toward the second region A2 via the third region A3, along with the rotation of the handle 7. Here, since the second end 62 passes through the first pathway 801 when the drag lever 5 is in the third region A3, the first end 61 maintains a state of being protruded from the drag lever 5. That is, the engagement of the engagement member 6 and the handle 7 is maintained while the drag lever 5 moves from the first region A1 to the second region A2 via the third region A3.

When the drag lever 5 is operated to the second region A2, the second end 62 of the engagement member 6 moves to the fourth pathway 804 via the second cam part 82. That is, the engagement member 6 moves in a direction away from the handle 7, and the first end 61 retracts into the drag lever 5. As a result, the engagement between the handle 7 and the engagement member 6 is released, and the drag lever 5 will not pivot even if the handle 7 is rotated. That is, the drag lever 5 can be operated to the second region A2, undo predetermined braking force that is set in advance can be applied to the spool 3. Meanwhile, when it is desired to apply a greater braking force to the spool 3, the drag lever 5 is further operated within the second region A2.

Conversely, when it is desired to apply a braking force that is smaller than the predetermined braking force that is set in advance to the spool 3, the drag lever 5 is operated from the second region A2 to the third region A3. A braking force that is smaller than the predetermined braking force that is set in advance can thereby be applied to the spool 3. When the drag, lever 5 is operated from the second region A2 to the third region A3 in this manner, the second end 62 of the engagement member 6 is moved along the second pathway 802. That is, the first end 61 of the engagement member 6 is retracted into the drag lever 5. In this manner, the engagement member 6 will not interfere with the handle 7, even when the drag lever 5 is positioned in the third region A3. As a result, a braking force that is smaller than the predetermined braking force that is set in advance can be applied to the spool 3.

Modified Example

Although each embodiment of the present invention has been presented heretofore, the present invention is not limited to the embodiments, and various modifications can be made without departing from the scope of the invention Modified Example 1

Figure 6:
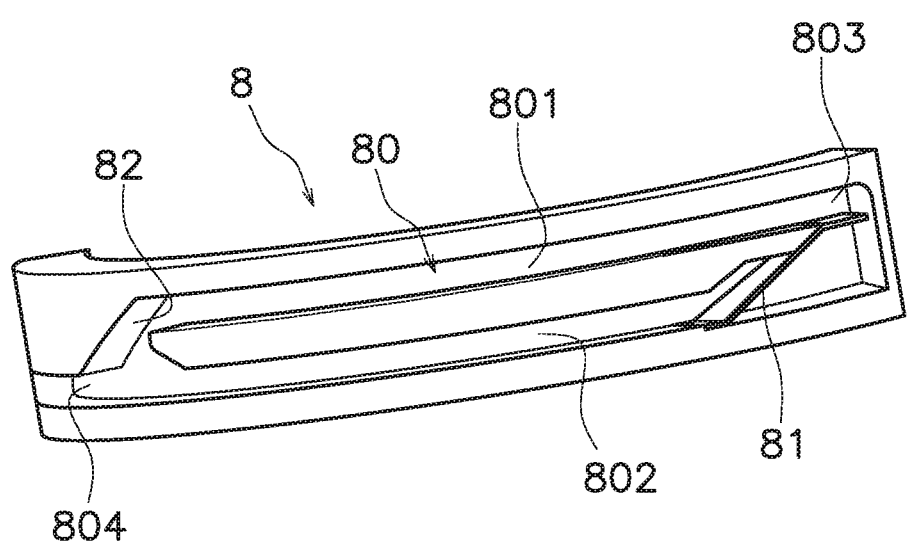
FIG. 6 is a perspective view of the rail according to a first modified example.

As shown in FIG. 6, the first cam part 81 may be a movable part. Specifically, the first cam part 81 can be a plate spring. When a force of a predetermined value or greater acts on the engagement member 6 in a direction in which the first end 61 of the engagement member 6 is retracted, the first cam part 81 is configured to move in the direction in which the first end 61 is retracted. Specifically, when a force in a direction away from the handle 7 of a predetermined value or greater acts on the first cam part 81, the first cam part 81 is movable in the direction away from the handle 7. According to the configuration of this modified example 1, when returning the drag lever 5 to the first region A1, even if the handle arm 71 is located in a position in which the first end 61 of the engagement member 6 is protruded and the handle arm 71 interferes with the first end 61, the drag lever 5 can be returned to the first region A1.

Modified Example 2

Figure 7:
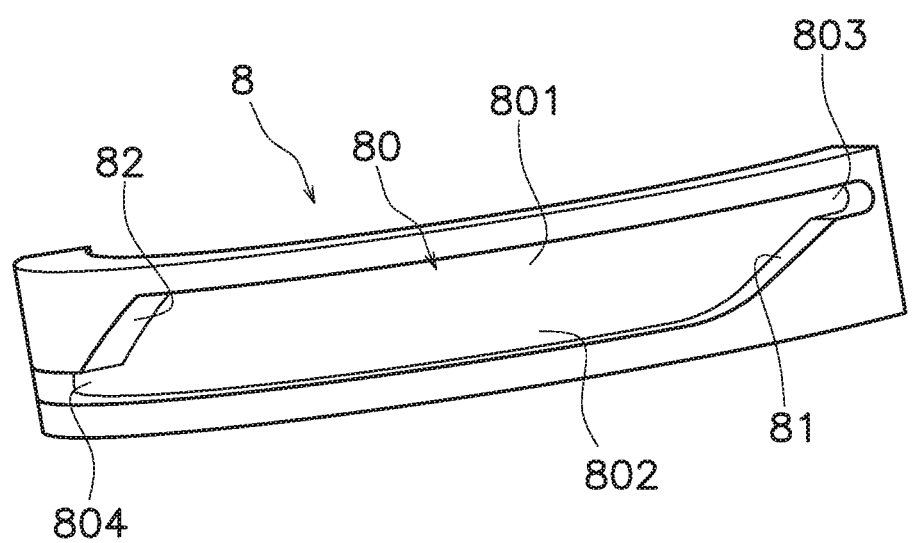
FIG. 7 is a perspective view of the rail according to a second modified example.
Figure 8:
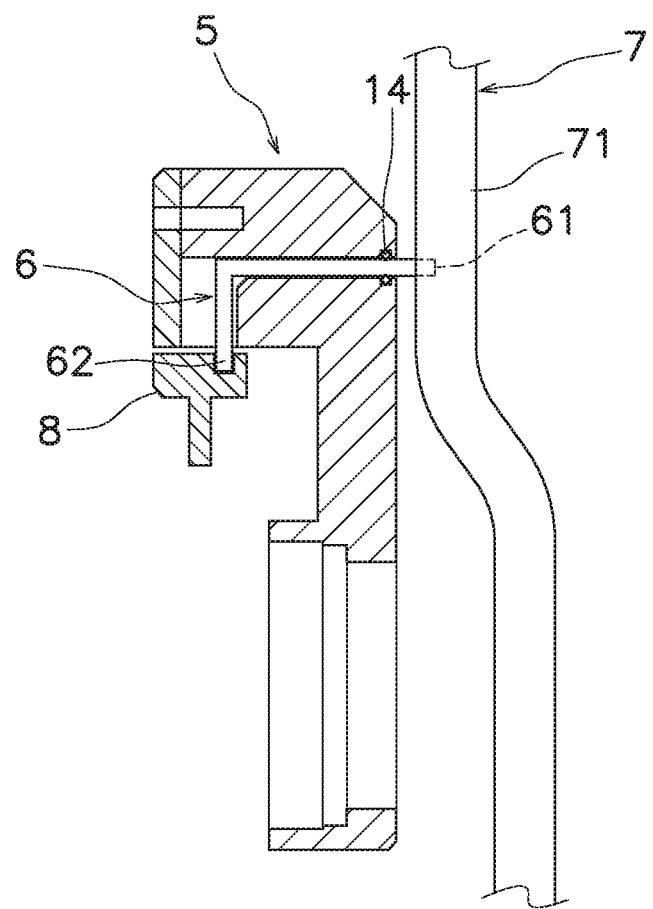
FIG. 8 is a cross-sectional view of the drag lever according to the second modified example.

In the embodiment described above, the rail 8 comprises a first pathway 801 and a second pathway 802; however, the pathway 80 of the rail 8 is not limited thereto. For example, as shown in FIG. 7, the first pathway 801 and the second pathway 802 may be integrally formed so that there is no wall between the first pathway 801 and the second pathway 802. In this embodiment, as shown in FIG. 8, the axial position of the engagement member 6 can be held by an O-ring 14 that is attached to the drag lever 5.

Modified Example 3

In the embodiment described above, the position where the first end 61 of the engagement member 6 starts to retract is constant, but the position where this first end 61 starts to retract may be variable. For example, the position where the first end 61 starts to retract can be varied by forming a plurality of second cam parts 82 in the circumferential direction and selecting the second cam part 82 through which the second end 62 of the engagement member 6 passes.

Modified Example 4

Figure 9:
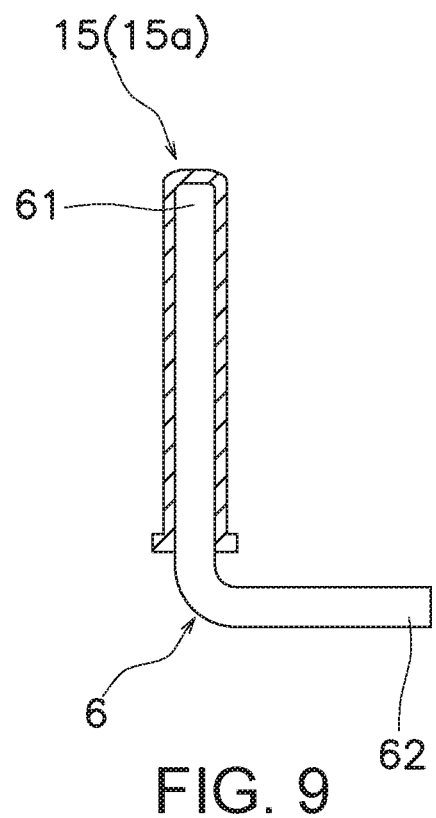
FIG. 9 is a cross-sectional view of a first cover portion of the cover member according to a fourth modified example.
Figure 10:
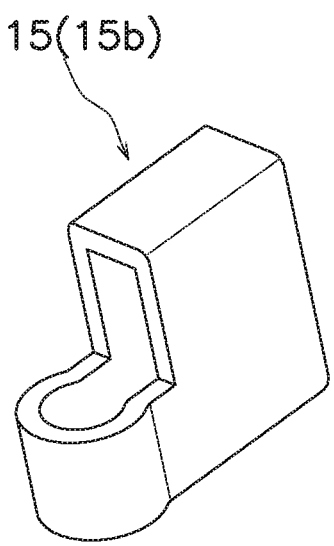
FIG. 10 is a perspective view of a second cover portion of the cover member according to the fourth modified example.
Figure 11:
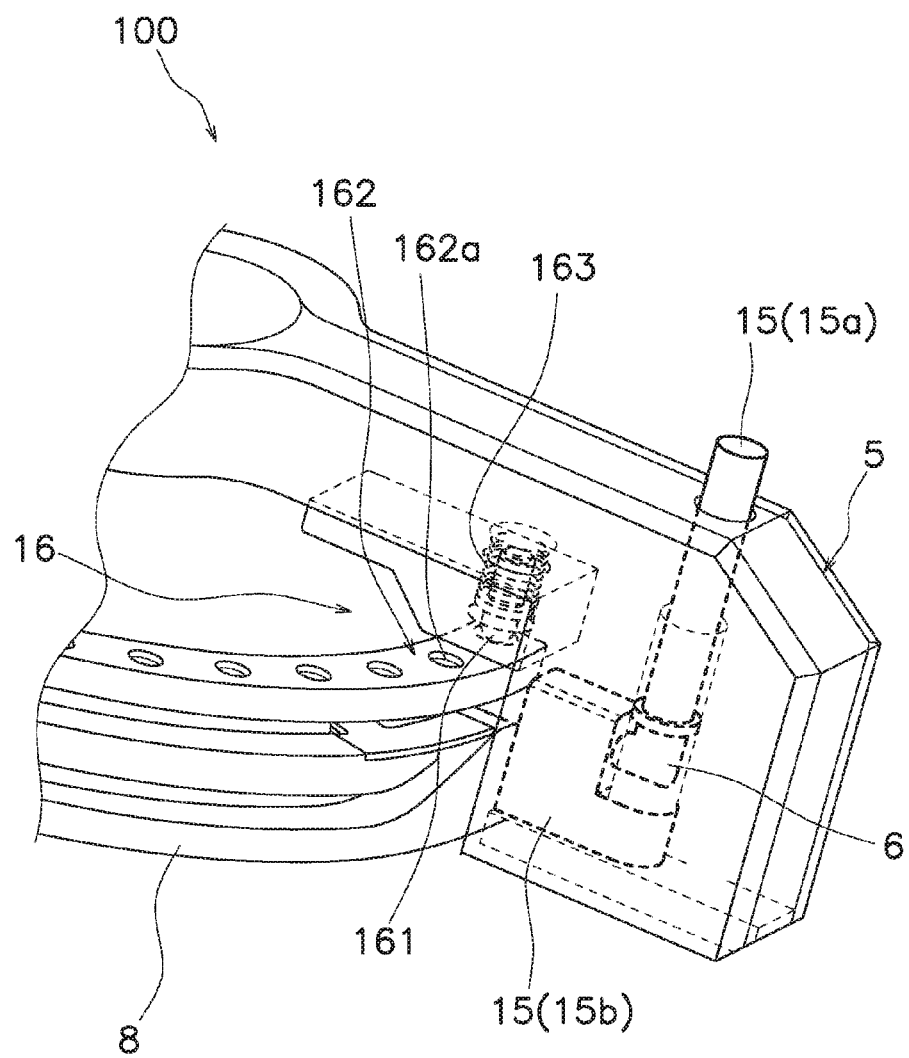
FIG. 11 is a perspective view of the sound generating mechanism according to a fifth modified example.

As shown in FIG. 9-FIG. 11, the dual-bearing reel 100 may further comprise a resin cover member 15. This cover member 15 covers the engagement member 6. That is, the cover member 15 is disposed between the engagement member 6 and the drag lever 5. Thus, the engagement member 6 and the drag lever 5 do not directly come into contact with each other. The cover member 15 comprises a first cover portion 15a (FIG. 9) and a second cover portion 15b (FIG. 10). The first cover portion 15a covers the portion of the engagement member 6 that extends in the axial direction. The second cover portion 15b covers the portion of the engagement member 6 that extends in the radial direction. The first cover portion 15a and the second cover portion 15b are separate members. Since the engagement member 6 is covered by a resin cover member 15 in this manner, the engagement member 6 can be prevented from undergoing galvanic corrosion, even if the engagement member 6 is made of metal.

Modified Example 5

As shown in FIG. 11, the dual-bearing reel 100 further comprises a sound generating mechanism 16 that generates a sound along with the pivoting of the drag lever 5. The sound generating mechanism 16 comprises a striking pin 161, a striking part 162, and a biasing part 163. The striking pin 161 protrudes from the drag lever 5 toward the striking part 162. The striking part 162 is a portion that is struck by the striking pin 161. The striking part 162 is disposed on the reel body 2. More specifically, the striking part 162 is disposed on a member of the reel body 2 to which the rail 8 is provided. The striking part 162 comprises a plurality of recesses 162a. The recesses 162a are disposed spaced from each other along the direction in which the drag lever 5 is operated. The biasing part 163 biases the striking pin 161 so as to strike the striking part 162. The biasing part 163 is, for example, a coil spring. The striking pin 161 is biased toward the striking part 162 by the biasing part 163, and therefore collides with the striking part 162 in the recess 162a to generate a sound. Further, the striking pin 161 retracts to the drag lever 5 when abutted against a portion other than the recess 162a. That is, a sound is generated every time the drag lever 5 is operated and the striking pin 161 hits the recess 162a.

What is claimed is:

1. A dual-bearing reel, comprising:
a handle;
a reel body having a first reel body portion and a second reel body portion;
a spool disposed between the first reel body portion and the second reel body portion;
a drag mechanism configured to brake rotation of the spool;
a drag lever configured to adjust a braking force of the drag mechanism, and being pivotably attached to the first reel body portion so as to be operatable between a first region and a second region; and
an engagement member protruding from the drag lever when the drag lever is in the first region, so as to engage the handle, and retracted into the drag lever when the drag lever is in the second region.

2. The dual-bearing reel recited in claim 1, wherein
the drag lever is configured to release braking of the rotation of the spool when in the first region, and
the drag lever is configured to enable braking of the rotation of the spool when in the second region.

3. The dual-bearing reel recited in claim 1, further comprising
a resin cover member disposed between the engagement member and the drag lever.

4. The dual-bearing reel recited in claim 1, further comprising
a sound generating mechanism configured to generate a sound along with the pivoting of the drag lever.

5. The dual-hearing reel recited in claim 4, wherein
the sound generating mechanism comprises
a striking pin protruding from the drag lever,
a striking part disposed on the reel body and configured and arranged to be struck by the striking pin, and
a biasing part configured to bias the striking pin toward the striking part.

6. The dual-bearing reel recited in claim 1, wherein the engagement member protrudes from the drag lever in an axial direction of the spool.

7. A dual-bearing reel, comprising:
a reel body having a first reel body portion and a second reel body portion;
a spool disposed between the first reel body portion and the second reel body portion;
a drag mechanism configured to brake rotation of the spool;
a drag lever configured to adjust a braking force of the drag mechanism and being pivotably attached to the first reel body portion so as to be operatable between a first region and a second region; and
an engagement member protruding from the drag lever when the drag lever is in the first region and retracted into the drag lever when the drag lever is in the second region,
the drag lever configured so as to be operatable into a third region, the third region being between the first region and the second region, and the drag lever configured to increase the braking force as the drag lever approaches the second region.

8. The dual-bearing reel recited in claim 7, wherein
the engagement member protrudes from the drag lever when the drag lever is operated from the first region to the third region, and
the engagement member is retracted into the drag lever when the drag lever is operated from the second region to the third region.

9. The dual-bearing reel recited in claim 7, further comprising
a rail disposed on the first reel body portion, and including a first cam part and a second cam part,
the engagement member comprising a first end configured to protrude from the drag lever or retract into the drag lever, and a second end configured to be guided by the rail, and
the first cam part configured to cause the first end to protrude from the drag lever and the second cam part configured to cause the first end to retract into the drag lever.

10. The dual-bearing reel recited in claim 9, wherein
the rail comprises a first pathway and a second pathway;
the second end of the engagement member is configured to pass through the first pathway when the drag lever is operated from the first region to the third region, and
the second end of the engagement member is configured to pass through the second pathway when the drag lever is operated from the second region to the third region.

11. The dual-bearing reel recited in claim 10, wherein
the rail comprises a third pathway that communicates with the first and second pathways and a one-way mechanism, and
the one-way mechanism is configured to block the third pathway from the second pathway when the second end moves from the third pathway to the first pathway, and
enable the third pathway to communicate with the second pathway when the second end moves from the second pathway to the third pathway.

12. The dual-bearing reel recited in claim 11, wherein
the one-way mechanism is a plate spring.

13. The dual-bearing reel recited in claim 9, wherein
the first cam part is configured to move in a direction in which the first end is retracted when a force of a predetermined value or greater acts on the engagement member in the direction in which the first end is retracted.

14. A dual-bearing reel, comprising:
a reel body having a first reel body portion and a second reel body portion;
a spool disposed between the first reel body portion and the second reel body portion;
a drag mechanism configured to brake rotation of the spool;
a drag lever configured to adjust a braking force of the drag mechanism, and being pivotably attached to the first reel body portion so as to be operatable between a first region and a second region;
an engagement member protruding from the drag lever when the drag lever is in the first region, and retracted into the drag lever when the drag lever is in the second region; and
a biasing member configured to bias the engagement member in a direction in which the engagement member is retracted.

* * * * *